Nov. 15, 1938.　　　M. NEWMARK ET AL　　　2,136,803
LUBRICATION APPARATUS AND THE LIKE
Filed Aug. 6, 1935　　　2 Sheets-Sheet 1

INVENTORS
Morris Newmark
Elias Moss
BY Kenyon & Kenyon
ATTORNEYS

Nov. 15, 1938.  M. NEWMARK ET AL  2,136,803
LUBRICATION APPARATUS AND THE LIKE
Filed Aug. 6, 1935  2 Sheets-Sheet 2

INVENTORS
Morris Newmark
Elias Moss
BY Kenyon & Kenyon
ATTORNEYS

Patented Nov. 15, 1938

2,136,803

UNITED STATES PATENT OFFICE 2,136,803

LUBRICATION APPARATUS AND THE LIKE

Morris Newmark and Elias Moss, New York, N. Y.

Application August 6, 1935, Serial No. 34,882

7 Claims. (Cl. 284—19)

This invention relates to pressure lubricating devices, including a lubricant dispensing device, lubricant receptacles attached to parts to be lubricated, and a connector for attaching the lubricant dispensing device with the receptacles.

It has for one of its objects the provision of a device of this character, the delivery end of which may be quickly attached to and detached from a nipple or lubricant receiving receptacle, and having means for centering the nipple and securing the same in place, and preferably having centering means which is responsive to a clamping operation by which the lubricant receptacle is clamped into the nozzle.

Another object of the invention is to provide a connection of the character described in which the delivery end will operate to seal with the lubricant receiving receptacle and open the valve in the delivery end to allow the free flow of the lubricant.

Another object of the invention is to provide such a lubricating device designed for engaging the lubricant receiving receptacle from the top and side thereof and having means for properly locating and seating the nozzle end thereof on the lubricant receiving nipple and to prevent rotary movement between the said parts, while the device is being secured in place.

A further object of the invention is to provide a device of this nature comprising a hollow plunger in communication at one end thereof with a pressure lubricator, a valve therein to regulate the flow of the lubricant, a hollow shell or barrel in which the said plunger operates, the said shell being adapted to be brought into coupling engagement with the head of a lubricant receiving nipple and having cutout means for centering the nipple and engaging the hexagonal or other polygonal base of the said nipple to prevent rotary movement between the said shell and nipple.

A further object of the invention is to provide a device of this nature comprising a screw threaded hollow plunger in communication at one end thereof with a pressure lubricator, a hollow shell complimentarily screw threaded in which the said plunger operates, the said shell being adapted to be prevented from separation from the plunger by a spinning or stamping operation of the upper end thereof.

A further object of the invention is to provide a device of this nature comprising a hollow plunger in communication at one end thereof with a pressure lubricator and the other end thereof having a sealing member held in permanent position by a spinning or stamping operation.

Another object is to produce a device of the character described in which the maximum simplicity of construction and operation is secured.

Another object of this invention is to provide means whereby a lubricant receptacle may be clamped in a nozzle as by means of screw threads cooperating between a plunger and a barrel and against a sealing part such as a washer which is held substantially unyieldingly while by the same clamping operation a valve is opened to permit flow of the lubricant.

A further object resides in combining a part presenting a sealing washer with means responsive to movement of said washer for opening a valve in a passage through said part.

A further object lies in limiting the movement of the valve responsive to movement of the sealing washer and in providing means for adjusting the limit of movement of said valve.

Other objects and advantages will appear as the nature of the improvements are better understood, the invention consisting substantially in the novel arrangement and co-relation of parts herein fully described, and illustrated in the accompanying drawings, wherein similar reference characters are used to describe corresponding parts throughout the several views, and then finally pointed out and specifically defined and indicated in the appended claims.

The disclosure made the basis of exemplifying the present inventive concept suggests a practical embodiment thereof, but the invention is not to be restricted to the exact details of this disclosure, and the latter, therefore, is to be understood from an illustrative, rather than a restrictive standpoint.

The inventive idea involved is capable of receiving a variety of mechanical expressions, one of which, for the purpose of illustration is shown in the accompanying drawings in which—

Figure 1:
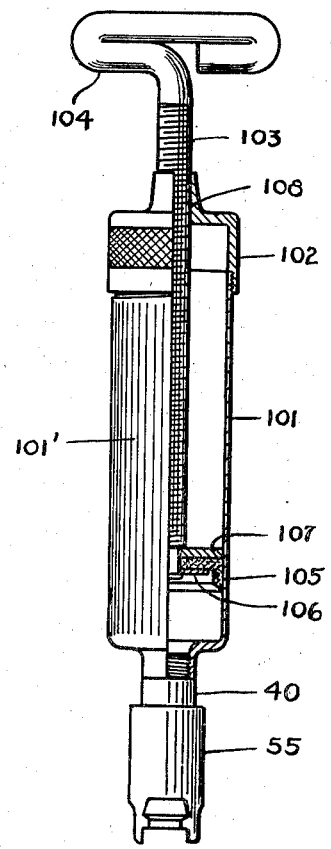
Figure 1 is a view in elevation, partly in section, of our improved lubricating device, ready to be coupled to the lubricating receptacle or nipple leading to the surface to be lubricated, the dot and dash lines showing the device slid into coupling engagement with the nipple.

Referring now to the drawings in detail, a grease gun is shown which includes a barrel 101 having a screw cap 102 attached to the end thereof by means of internal threads in the flange of the screw cap and external threads in the end of the barrel. The internal diameter of the unthreaded portion of the cap 102 is substantially the same as the internal diameter of the barrel and these portions are designed to abut one another when the cap is screwed in place.

An externally threaded rod 103 having a handle 104 cooperates with the internally threaded portion 108 of the cap 102 and carries at opposite end thereof a lubricant expelling cup washer 105 maintained between a backing washer 107 and another washer 106 as shown. The cap 102 is sufficiently long to permit the washer assembly comprising washers 105, 106, and 107 to be withdrawn completely into the cap just beyond the threaded portion thereof. The cap is preferably not made substantially longer than is required to answer this purpose. Moreover the barrel of the gun may have a knurl or otherwise roughened exterior 101'.

The lubricant receiving receptacle or nipple comprises screw threads 1, a portion 2 (shown as hexagonal in this figure), a check valve 3, valve seat 4, a coil spring 5 to seat the valve against the valve seat, an annular flange 6 for retaining the spring in the fitting, and face 7 of head 8, a neck 9, and a tapered annular shoulder 10 underlying the head 8.

While a grease gun has been described, any other lubricant dispensing device affording a source of lubricant under pressure may be employed having either a rigid or flexible outlet leading to the nozzle now to be described.

The nozzle or coupler element of the lubricating device comprises a plunger portion 40 which can be attached to a lubricant gun or conduit by screw threads 41, and which has a passage in the form of a bore 75 for the flow of lubricant through said plunger. The plunger is adapted to have rotational and longitudinal movement within the barrel.

The other end of the plunger presents a sealing part and is preferably stamped or spun over at 45 after a washer 44 is inserted in the end of the plunger, thereby permanently retaining the washer in the end of the barrel.

The plunger 40 is preferably recessed at 46 so that grease may get behind the washer 44 to augment the seal afforded by the washer.

The portion 45 stamped or spun over affords an orifice in the end of the plunger 40 adapted to loosely fit about the head 8 of the fitting inserted therein and pressed against the washer 44. The faces of the orifice are tapered to correspond approximately to the taper of the head 8.

The plunger portion 40 includes a shoulder 48 forming a valve seat upon which an outwardly closing poppet type valve 49 is adapted to seat. Threaded into the bore of plunger 40 is a removable and adjustable hollow plug 50, the inner end of which is adapted to limit the backward movement of valve 49. The end of the valve 49 has one or more slots 51 in the end thereof to afford a lateral passage for the grease when the valve is unseated and pushed backward against the inner end of plug 50. A spring 52 is interposed between the end of the valve 49 and the shoulder 53 in the plug 50.

A connecting sleeve or barrel 55 is mounted by screw threads 54 on the plunger 40. The barrel extends beyond the plunger and terminates in bifurcated portion including shoulder 56 that is adapted to center the fitting by underlying the shoulder 10 of a fitting inserted in the coupling sleeve. The inclination of the surfaces provided by these shoulders affords centering means whereby the fitting is accurately centered in barrel. Moreover this centering is responsive to the clamping of head of the receptacle between the plunger and the shoulder of the barrel.

Figure 4:
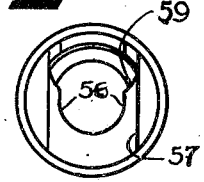
Figure 4 is a bottom plan view of the nozzle portion of the device.

The bifurcated portion of the coupling barrel also includes a slotted portion having faces 57 adapted to cooperate with faces of the polygonal portion 2 (e. g., hexagonal or square) of the fitting so as to prevent rotation of the sleeve 55 with respect to the fitting. The form of the slot is shown in Figure 4.

The fitting may be attached to the coupling sleeve by a lateral movement through the side entrance 58. The fitting may also be attached to the coupling sleeve by a longitudinal, but not an axial, movement of the fitting with respect to the sleeve through a cut out portion 59 of shoulder 56 followed by a lateral movement of the fitting into axial relation with respect to the sleeve, as well as by an angular movement of the barrel relative to the receptacle.

After the sleeve has been attached to the fitting by the hooking movement just described relative rotation of the barrel 55 and of the plunger 40 forces the head of the fitting 7 against the washer 44 and opens the valve 49.

Figure 2:
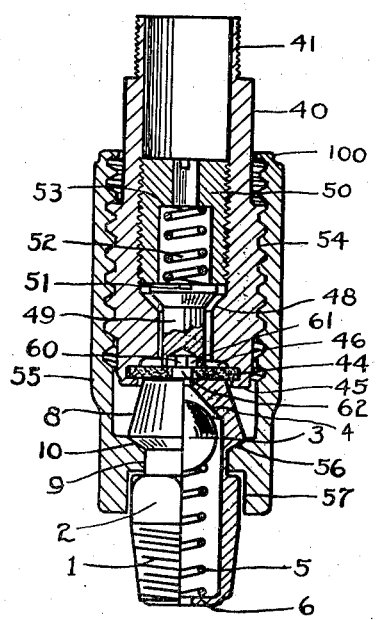
Figure 2 is a sectional view of the nozzle portion of the device, and part sectional and part elevational view of the lubricating receptacle or nipple portion of the device.

The coupler is shown in Figure 2 with the parts thereof in the position which they occupy when the fitting is inserted and tightly locked in the coupler. It will be noted that the washer is bent inwardly to a slight extent and that the valve, by virtue of the fact that the stem thereof rests against the washer, is moved off its seat so as to permit lubricant to flow around the outside of the valve member, through slots (or parts) 60, into hollowed out part 61 at the end of valve stem and thence through the orifice 62 in the washer 44 and into the fitting, the ball valve in the fitting being depressed by the pressure on the lubricant as required.

Figure 3:
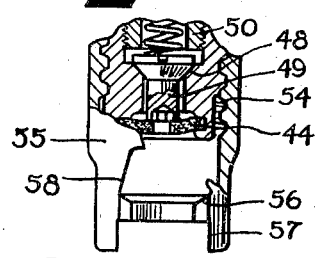
Figure 3 is a part sectional and part elevational view of the lower end of the nozzle portion of the device.

When the fitting is disconnected from the coupler, the washer and valve stem assume the position shown in Figure 3. It is to be noted that the washer 44 has been bent outwardly enough to permit the seating of the valve. In this modification the stem of the valve 49 preferably remains in contact with the washer 44 and normally bites into the washer 44 to a slight extent.

To prevent loss of the sleeve 55, and the removal of same from the barrel portion of the coupler, the top of the coupling sleeve is provided with an annular shoulder 100 which is adapted to cooperate with the end of the threads for attaching the coupling sleeve to the barrel of the coupling to limit longitudinal movement of the sleeve relative to the barrel. This annular shoulder is formed by a spinning or stamping operation.

Figure 5:
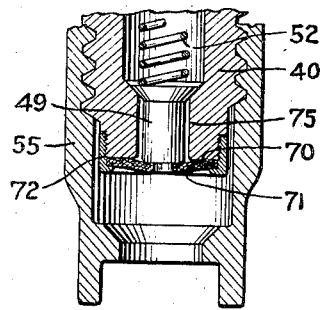
Figure 5 is a sectional view of the lower end of a modified form of nozzle embodying our invention.
Figure 6:
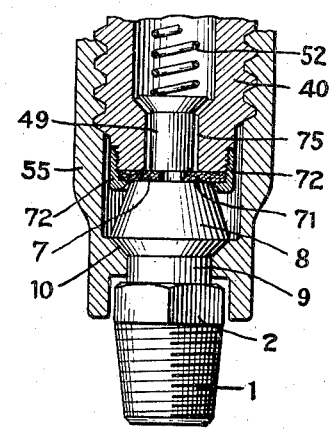
Figure 6 is a sectional view of the modification shown in Figure 5 with a receptacle shown clamped in the nozzle.
Figure 7:
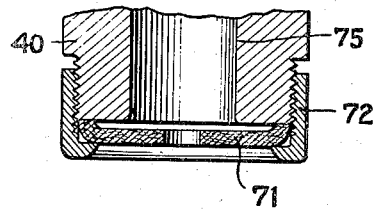
Figure 7 is a sectional view of the lower end of the nozzle shown in Figure 5 with the parts partly disassembled to show the cup shape of the washer prior to completion of the assembly.

In the modification shown in Figures 5 and 6, the end of the plunger 40 has a flat end surface 70 and the stem of valve 49 protrudes slightly from the bore 75 of the plunger. In this modification a cup shaped washer 71 is used as shown in Figure 7 wherein the parts are partially assembled. When the parts are completely assembled the washer takes the position as shown in Figure 5. By having the washer cup-shaped there is an increased tendency of the washer to bend outwardly so as to permit the valve to become seated more readily. It is to be understood, however, that a flat washer such as the washer 44 shown in Figures 2 and 3 may be employed in the modification shown in Figures 5 and 6 and that a cup shaped washer may be employed in the modification shown in Figures 2 and 3. In the modification shown in Figures 5 and 6 it is to be noted that the washer 71 is pressed against the surface 70 of the end of plunger 40 and between this surface and the end surface 7 of the lubricant receptacle when the receptacle is clamped into the nozzle responsive to the screw threaded connection between the plunger and barrel portions of the nozzle. Thus the movement of the washer is substantially nonyieldingly limited after it has been moved, in at least the central portion thereof, sufficiently to open the valve. In the modification shown in Figs. 5 and 6 the washer 71 is peripherally carried by the plunger 40 by means of a cap 72 screw threadedly attached to the end of plunger 40.

We claim:

1. In pressure lubricating apparatus, a nozzle adapted to connect a pressure lubricating device to a lubricant receptacle, the combination comprising a barrel, means for preventing relative rotation between said barrel and said receptacle, a plunger so mounted within said barrel as to be moved longitudinally upon rotation of said plunger relative to said barrel and having an axial bore therethrough communicating with said lubricating device, an outwardly closing valve in said bore having a stem longitudinally slidable in said bore, a washer having a central opening therethrough of lesser diameter than the diameter of said stem peripherally mounted in said plunger adjacent the end thereof and transversely with respect to said stem, means attached to said plunger for holding said washer mounted in said plunger during longitudinal movement of said plunger relative to said barrel, means coacting between said barrel, said receptacle and said plunger for clamping said receptacle in said nozzle with a portion of said receptacle pressed against said washer by a clamping operation including a rotational movement of said plunger relative to said barrel, said washer being adapted to be pressed toward said valve stem to open said valve during said clamping operation.

2. In a pressure lubricating system including a source of lubricant under pressure, lubricant receptacles attached to parts to be lubricated, and a connector nozzle for detachably connecting said source of lubricant to said receptacles, the combination comprising a nozzle having two relatively movable members, one of said members having means for connecting same to a receptacle by a lateral movement of said member with respect to said receptacle and having surfaces adapted to coact with a polygonal flange in said receptacle to prevent rotation of said member relative to said receptacle and the other of said members having passage and a valve for controlling the flow of lubricant through said passage, screw thread means for moving said members axially with respect to each other, and means responsive to said screw thread means for clamping a portion of said receptacle in said nozzle between portions of said members, sealing the connection between said nozzle and said receptacle and opening said valve.

3. In pressure lubricating apparatus, a nozzle adapted to connect a lubricant dispensing device with a lubricant receptacle, said nozzle comprising a member having a bore communicating with said lubricant dispensing device, an outwardly closing valve for controlling the flow of lubricant through said bore, a sealing part carried by said member, means including said sealing part for moving said valve rearwardly to open said valve upon coupling said nozzle with said receptacle in sealed relation, and a stop for limiting the rearward movement of said valve upon coupling said nozzle with said receptacle in sealed relation.

4. In pressure lubricating apparatus, a nozzle adapted to connect a lubricant dispensing device with a lubricant receptacle, said nozzle comprising a member having a bore communicating with said lubricant dispensing device, an outwardly closing valve for controlling the flow of lubricant through said bore, a sealing part carried by said member, means including said sealing part for moving said valve rearwardly to open said valve upon coupling said nozzle with said receptacle in sealed relation, a stop for limiting the rearward movement of said valve upon coupling said nozzle with said receptacle in sealed relation, and means for adjusting the position of said stop.

5. In apparatus of the character described, a nozzle and a receptacle, said nozzle comprising a part with a bore therethrough, an outwardly-closing valve in said bore, a sealing washer, means for coupling said part with said receptacle and for moving said part responsive to screw threads toward said receptacle with said washer interposed between said receptacle and said part, means for supporting said washer so that at least the center of said washer is movable relatively to said part, means interposed between said sealing washer and said valve for opening said valve responsive to pressure of said receptacle against said washer, and a stop rigid with respect to said part and arranged so that when said receptacle is moved toward said part in coupling said part with said receptacle said sealing washer is initially moved at least in the center thereof to open said valve and then is rigidly maintained with respect to said part on the surface thereof opposite to the surface thereof in contact with said receptacle.

6. In pressure lubricating apparatus, a nozzle adapted to connect a pressure lubricating device with a lubricant receptacle, said nozzle comprising a part having a bore therethrough communicating with said lubricant dispensing device and an outwardly closing valve in said bore that is movable relatively to said part, a sealing washer, means attached to said part for mounting the periphery of said washer rigidly with respect to said part, means for coupling said part with said receptacle and for providing movement of said receptacle relatively to said part during the coupling of said receptacle with said part, said washer being interposed between said receptacle and said valve so as to provide for movement of the central portion of said washer relatively to said part for opening said valve during the coupling of said part with said receptacle.

7. In pressure lubricating apparatus including a lubricant dispensing device, a lubricant receptacle and a nozzle adapted to connect said lubricant dispensing device with said receptacle, the combination comprising a nozzle having a barrel and a plunger screw threadedly mounted within said barrel, said plunger having a bore therein communicating with said device and an outwardly closing valve in said bore, a receptacle having a head portion and a neck portion and an annular tapered shoulder at the base of said head portion and between said head portion and said neck, a sealing washer presented by said plunger so that at least the central portion of said washer is movable relatively to said plunger, means interposed between said valve and said sealing washer for opening said valve responsive to pressure of said receptacle against said washer, and means for connecting said barrel with said receptacle by a lateral movement of said barrel relatively to said receptacle including a shoulder secured to said barrel adapted to coact with said annular tapered shoulder of said receptacle to prevent axial withdrawal of said head of receptacle from said barrel when said receptacle and said barrel are in axial alignment, said shoulder on said barrel being adapted to coact with said annular tapered houlder on said receptacle so as to center said receptacle with respect to said nozzle when said head of said receptacle is clamped between said washer and said shoulder of said barrel by relative rotation of said plunger and said barrel.

MORRIS NEWMARK.
ELIAS MOSS.